April 13, 1937.  C. D. PETERSON  2,077,130
REAR ENGINE DRIVE FOR MOTOR VEHICLES
Filed June 24, 1935  2 Sheets-Sheet 1
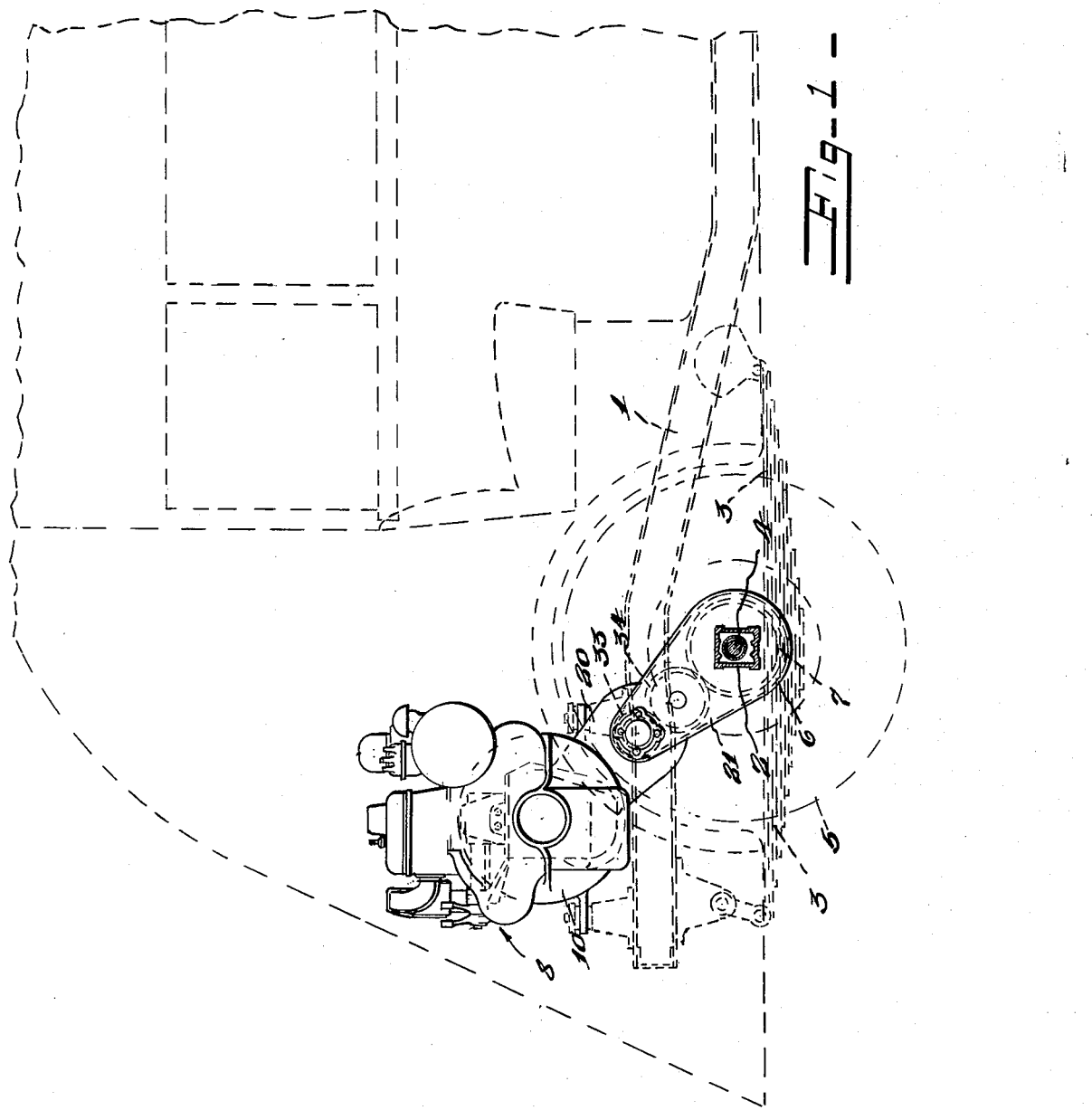

April 13, 1937. C. D. PETERSON 2,077,130
REAR ENGINE DRIVE FOR MOTOR VEHICLES
Filed June 24, 1935 2 Sheets-Sheet 2
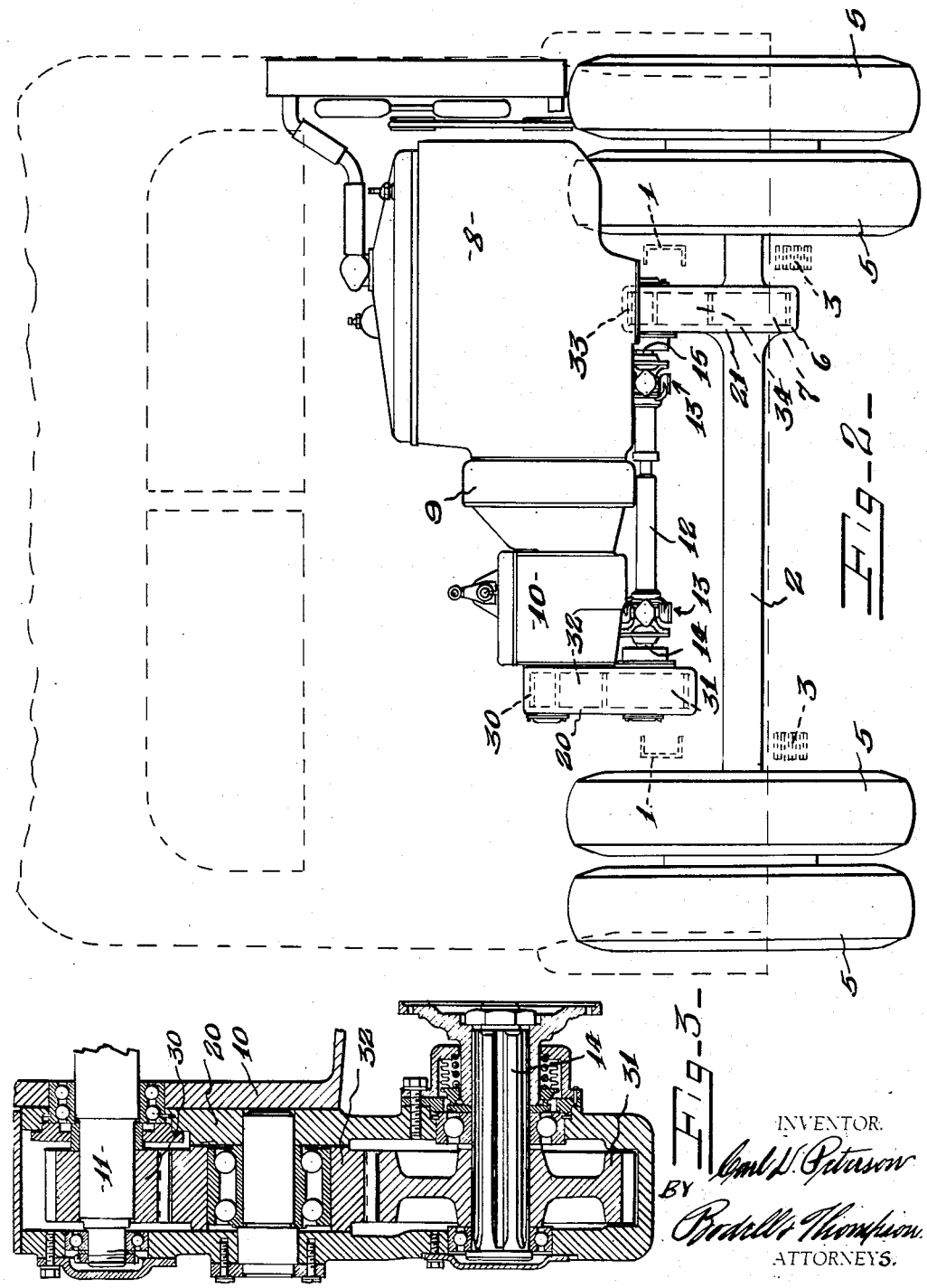

Patented Apr. 13, 1937

2,077,130

UNITED STATES PATENT OFFICE 2,077,130

REAR ENGINE DRIVE FOR MOTOR VEHICLES

Carl D. Peterson, Toledo, Ohio, assignor to Spicer Manufacturing Corporation, Toledo, Ohio, a corporation of Virginia Application June 24, 1935, Serial No. 28,129

1 Claim. (Cl. 180—70)

This invention relates to motor vehicles, and particularly to motor vehicles of the type in which the power plant unit is mounted adjacent the driving axle, and more particularly to motor vehicles having a rear engine drive wherein the power plant is mounted adjacent the rear axle which is the driving axle.

It has for its object, a particularly simple arrangement of the power plant unit and axle, whereby the conventional type of change speed gearing, or gear set, and propeller shaft is used, or an arrangement of the power plant unit including the engine and change speed gear, and motion transmitting means between the transmission or tail shaft of the change speed gear and the propeller shaft, and between the propeller shaft and the differential gear of the axle, whereby the relative up and down movement can take place with the conventional drive, or propeller shaft, which up and down movement takes place because the chassis is spring supported on the axle.

It further has for its object, an extension housing or support on, or applied to, the conventional gear housing of the unit power plant, and a similar housing on the rear axle, or differential gear housing, a train of gears in the former extension housing between the transmission or tail shaft and one end of the propeller shaft, and a train of gears in the other extension housing between the other end of the propeller shaft and the driving gear of the differential, these extension housings being rigid with the gear housing and the differential housing respectively.

It further has for its object, a relative arrangement of the engine, axle and propeller shaft, whereby the propeller shaft, or drive line, is below the seat level, thereby keeping the floor level low.

The invention consists in the novel features and in the combinations and constructions hereinafter set forth and claimed.

In describing this invention, reference is had to the accompanying drawings in which like characters designate corresponding parts in all the views.

Figure 1 is an end elevation of this rear engine drive, looking from the front of the engine, the radiator being removed, the contiguous portions of the vehicle being also shown.

Figure 2 is an elevation of parts seen in Figure 1, looking to the right.

Figure 3 is a detail view of the train of gears between the transmission shaft and one end of the propeller shaft, this being also illustrative of a train of gears that may be employed between the other end of the propeller shaft and the differential.

This invention comprises generally, a driving axle unit of a motor vehicle, a power plant including an engine and a change speed gearing, or gear set, the power plant unit being arranged with its axis, that is the axis of the crank shaft, extending lengthwise of the axle unit, a support extending from the power plant unit and rigid with the power plant unit and free of the axle unit, a second support extending from the housing of the axle unit toward the power plant unit and rigid therewith, a propeller shaft including universal joint means, journalled at its ends in said supports, gearing located between the power plant unit and one end of the propeller shaft and being carried by one support, and gearing located between the other end of the propeller shaft and the differential gear of the the rear axle unit and carried by the other support.

The power plant unit is suitably supported on the chassis 1, and the chassis is spring supported from the rear axle 2 through springs 3 of any suitable construction.

The rear axle construction includes the usual housing in which are mounted shaft sections 4 on the outer ends of which the drive wheels 5 of the vehicle are mounted in the usual manner, and also a differential gearing located in the differential gear housing 6, the differential gearing including a drive or ring gear, or what corresponds to a ring gear 7. The power plant unit includes an engine 8 and accessories, a clutch mounted within the clutch housing 9, and a gear set located within a gear box or housing 10 with the transmission shaft or tail shaft 11 extending through the rear wall of the gear box in the usual manner. The gear set is of the conventional type including drive and transmission shafts arranged in axial alinement, a countershaft gear on the shaft, some of which are shiftable to connect the drive and transmission shafts in direct drive relation, or in indirect drive relation through the countershaft, all as is well understood.

12 designates generally, the propeller shaft, this including one or more universal joints, and as here shown, it includes two universal joints 13 which connect end sections 14 and 15 to the opposite ends of the intermediate section. The power plant unit and propeller shaft are arranged with their axes extending lengthwise of the axis of the driving axle, and out of the vertical plane of the driving axle, and preferably to the rear of said vertical plane with the propeller shaft located in an oblique line between the driving axle and the axis of the power plant, so that it is arranged low down between the horizontal planes of the axes of the power plant unit and that of the driving axle.

20 and 21 designate respectively supports for the trains of gearings between the transmission shaft and one end of the propeller shaft, and between the other end of the propeller shaft and the ring gear of the differential gear, these supports being usually housings, each of which encloses a train of gears. The housing 20 is a downward, or drop extension, inclining forward of the gear box and is rigid with the gear box, and the housing 21 is an upward and rearward extension inclining upward from the housing of the differential gear casing, and the housing 20 is entirely free of and unconnected to the axle, or free to move upwardly and downwardly relatively to the axle, and the housing 21 is entirely free of the power plant unit, or free to move upwardly and downwardly relatively to the power plant, as the vehicle travels over bumps in the road. The train of gearing between the transmission or tail shaft 11 of the gear set and one end section 14 of the propeller shaft, as here shown includes gears 30 and 31 mounted respectively on the projecting end of the transmission shaft and on the end section 14 of the propeller shaft, and an idler gear 32 meshing with the former gears. The gear 32 is mounted on a suitable stud supported in the extension housing 21, as seen in Figure 3. Similar gears 33, 34 and 7 are mounted respectively on the end section 15 of the propeller shaft and on the differential gear casing, the gear 7 corresponding to, or being, the ring gear of the differential. The differential gear is located nearer one end of the rear axle assembly than the other, instead of in the middle, in order to give space for a comparatively long propeller shaft.

Owing to the extension housing, or drop gear case, attached to a standard transmission gearing, a conventional universal joint and propeller shaft drive can be used in a rear engine drive for motor vehicles. Also, owing to this arrangement, the drive line, or propeller shaft, can be located below the seat level, thereby keeping the floor level low, as seen in Figure 1.

What I claim is:

In a motor vehicle, the combination with a suitable chassis, driving axle unit including a differential gear and housing, springs supporting the chassis on the driving axle and a power plant unit mounted on the chassis above the axle unit and in the rear of the vertical plane thereof with its axis of rotation substantially paralleling the driving axle unit, the power plant including a gear set and housing in line with the engine; of a propeller shaft including universal joint means, the propeller shaft extending substantially parallel to the axle unit and located out of the vertical plane of the axle unit and to the rear thereof, supports in which the opposite ends of the propeller shaft are journalled respectively, one support being rigid with the gear set housing and inclining downward toward the axle unit and the other support being rigid with the axle unit and inclining upward toward the power plant unit, gearing between the gear set and one end of the propeller shaft and supported by one of said rigid supports and gearing between the other end of the propeller shaft and the drive gear of the differential and supported by the other of said rigid supports.

CARL D. PETERSON.